(12) United States Patent
Austin

(10) Patent No.: US 7,032,931 B2
(45) Date of Patent: Apr. 25, 2006

(54) NUT LOCKING APPARATUS

(75) Inventor: John Austin, Oregon City, OR (US)

(73) Assignee: Crane-Resistoflex, Marion, NC (US)

( * ) Notice: Subject to any disclaimer, the term of this patent is extended or adjusted under 35 U.S.C. 154(b) by 154 days.

(21) Appl. No.: 10/431,628

(22) Filed: May 6, 2003

(65) Prior Publication Data

US 2004/0036292 A1    Feb. 26, 2004

Related U.S. Application Data

(62) Division of application No. 09/562,694, filed on Apr. 28, 2000, now Pat. No. 6,557,900.

(60) Provisional application No. 60/131,836, filed on Apr. 30, 1999.

(51) Int. Cl.
*F16L 55/00* (2006.01)
*H01R 4/38* (2006.01)

(52) U.S. Cl. .......................................... 285/92; 439/321
(58) Field of Classification Search ................. 285/92; 439/321
See application file for complete search history.

(56) References Cited

U.S. PATENT DOCUMENTS

| | | | | |
|---|---|---|---|---|
| 2,728,895 A | * | 12/1955 | Quackenbush et al. ..... | 439/321 |
| 4,030,798 A | * | 6/1977 | Paoli ........................... | 439/321 |
| 4,285,564 A | * | 8/1981 | Spinner ....................... | 439/321 |
| 4,655,482 A | * | 4/1987 | Myers et al. .................. | 285/81 |
| 5,145,394 A | * | 9/1992 | Hager .......................... | 439/321 |
| 5,188,398 A | * | 2/1993 | Parimore et al. ............. | 285/39 |
| 5,435,760 A | * | 7/1995 | Miklos ........................ | 439/321 |
| 5,851,035 A | * | 12/1998 | Marc et al. .................... | 285/86 |
| 6,293,595 B1 | * | 9/2001 | Marc et al. .................... | 285/92 |

* cited by examiner

*Primary Examiner*—James M. Hewitt
(74) *Attorney, Agent, or Firm*—Fitzpatrick, Cella, Harper & Scinto

(57) ABSTRACT

A locking tubing system includes a length of tubing lying in any geometric complexity including a substantially straight line and a first fitting body having a securing member rotationally locked thereto. The first fitting body is affixed to one end of the length of tubing. The system also includes a first nut having a plurality of openings in cooperative relation to engage the securing member, a second fitting body having a securing member rotationally locked thereto, the second fitting body is affixed to the other end of the length of tubing and a second nut having a plurality of openings in cooperative relation to engage the securing member. The first nut and the second nut are threaded onto corresponding mated fittings, each securing member being engaged with at least one of the openings of the respective nuts thereby locking each of the nuts to the respective fitting body.

6 Claims, 12 Drawing Sheets

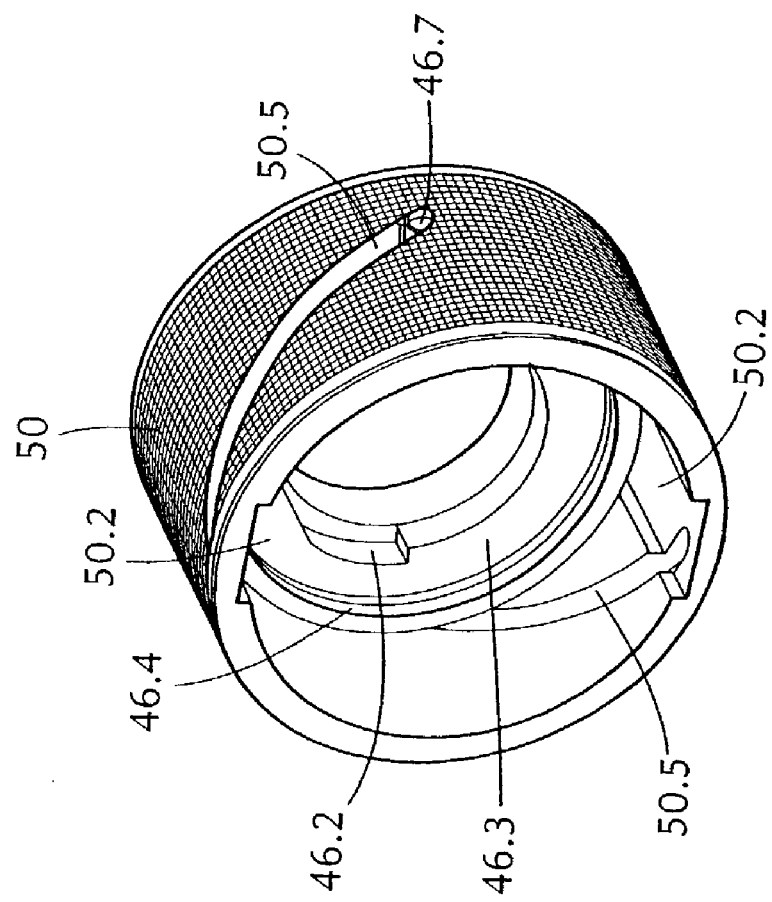
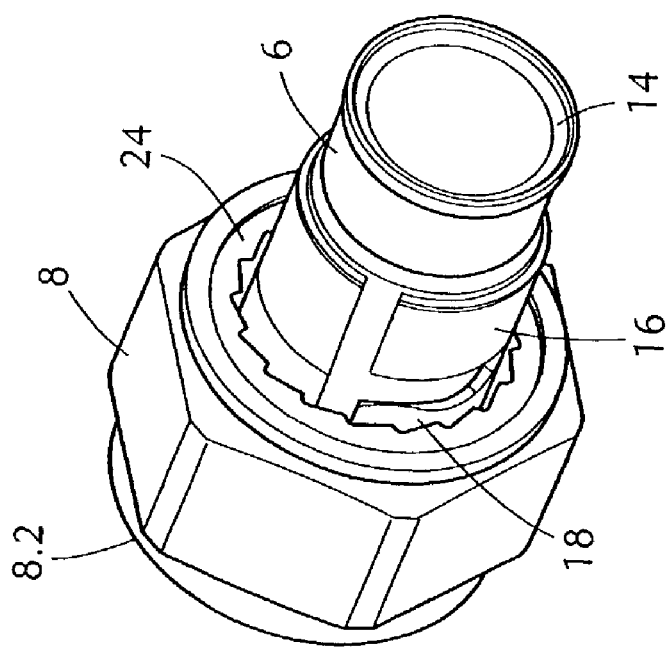
FIG. 4
FIG. 3

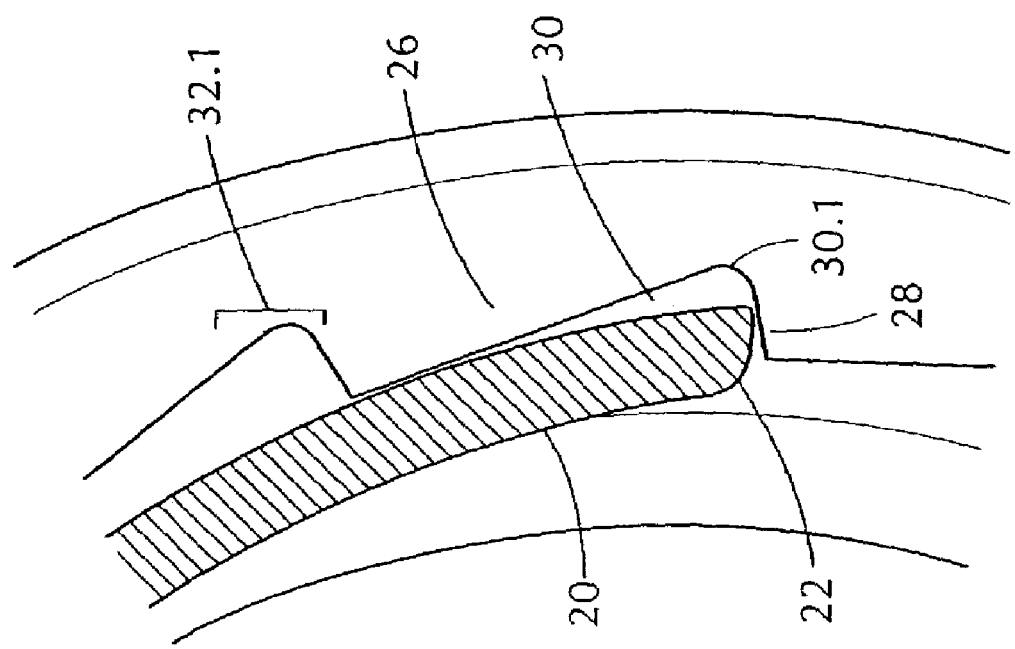
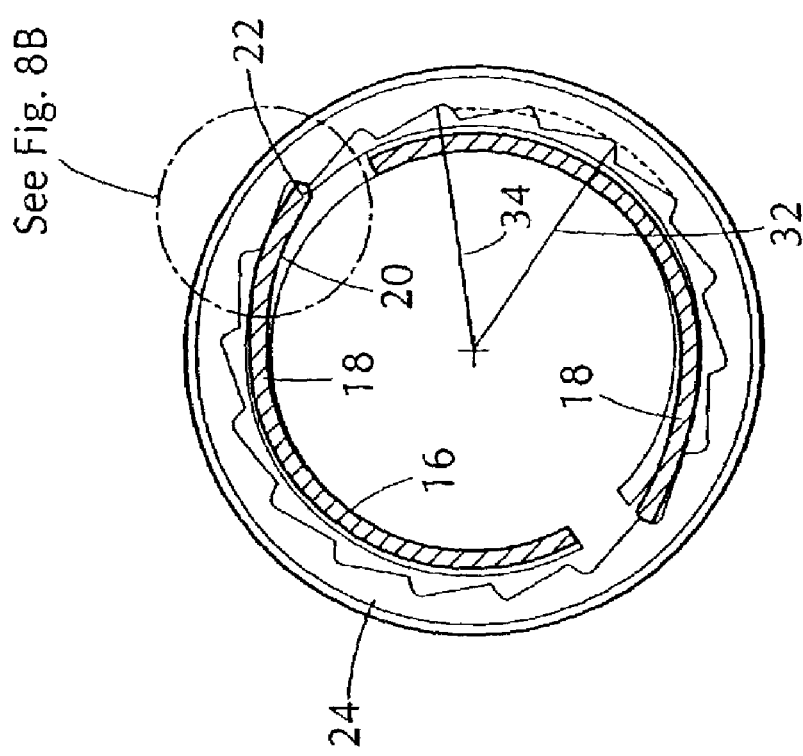
FIG. 8B
FIG. 8A

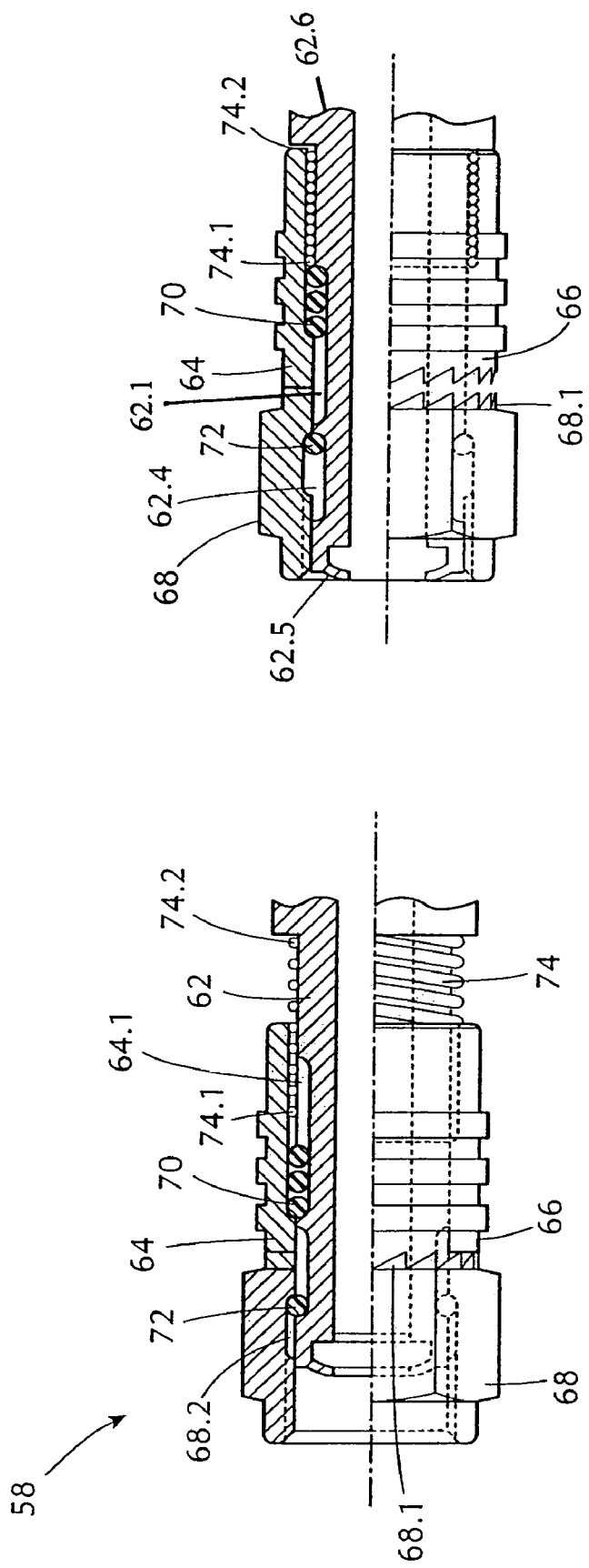

NUT LOCKING APPARATUS

This application is a division of application Ser. No. 09/562,694, filed Apr. 28, 2000, which issued on May 6, 2003 as U.S. Pat. No. 6,557,900; and claims priority from provisional application 60/131,836, filed on Apr. 30, 1999.

FIELD OF THE INVENTION

The present invention relates to self-securing fasteners to prevent unwanted loosening of a fastener, and more particularly to a locking device for securing a nut to a fitting assembly of a fluid-coupling.

BACKGROUND OF THE INVENTION

A problem associated with the use of nuts with fasteners and couplings is that of the nut backing out or loosening. The problem has been associated with vibrational, environmental, and other dynamic factors, which cause short-term loss of pre-load and nut back-off.

This problem is particularly apparent in the aircraft industry. In a study conducted by the Society of Automotive Engineers (SAE), 22% of fluid fittings that contained leakage were attributed to loose fittings due to nut back-off.

The prior art includes products which have tried to address the problem. For example, locking washers, spring washers, prevailing torque threads, deformed threads, plastic thread inserts, anaerobic adhesives, double-nutting, and locking pins have been used for fasteners. For fluid fittings and the like, the most common method of preventing nut loosening is by using a "safety wire", in which a length of stainless steel wire is attached to the nut of the fluid coupling via a small hole. The other end of the wire is tied to a nearby component such that the nut rotation in the loosening direction is resisted by the wire.

The safety wire device, however, is costly, since it is extremely labor intensive. A mechanic must take an extra step to insure the nut stays put by affixing the safety wire device to a nearby component after tightening the nut. Thereafter, an additional step must be taken to twist the wire to eliminate the slack. The method is also prone to produce dangerous foreign object damage, since the wires must be trimmed—the excess of which can end up in moving components causing damage. In addition, since the wires must be cut if the particular fitting requires maintenance and/or routine re-tightening, the cutting produces sharp wire ends which may snag other objects or a mechanic's hands. The wires also may break while being twisted to remove slack.

Attempts have been made to improve on the safety wire method by attempting to secure the nut to the mating half (the male half) of the coupling. One such convention device is a Moeller fitting, which provides torque resistance to the nut by positioning a pattern of torque "bumps" along the male end of the coupling and corresponding recesses positioned along the interior surface of the nut to receive these bumps when mating the male and female halves. This system, however, requires that both the male and female coupling components conform to the Moeller design; i.e., one must replace both the male and female halves in using the Moeller design.

SUMMARY OF THE INVENTION

The present invention presents a new and unique device for providing a nut that locks to the female coupling half of a fitting assembly. By including a nut-locking device on the female half of the fitting assembly, it can be used with standard male fittings made by all manufacturers and also retrofitted on fittings used in previously installed fluid systems. Thus, the more expensive, bulky components can remain intact and. retrofitted with new locking female assemblies according to the present invention.

The present invention seizes on the concept of locking the nut to the female coupling half on which it is normally a component part. Thus, all manufacturing design dimensions, materials of construction and component pre-assembly are within the manufacturer's control, insuring a high-quality assembly.

By locking the nut to the female component, reactional forces from a mated fitting are transmitted to and directly resisted by a length of tubing affixed to the rear end of the female assembly. The forces are transmitted to the length of tubing via the nut and a securing member used to secure the nut to the female assembly.

In addition, with the female assembly component being most often immovably affixed to the rigid tubing to which it is attached by welding or other affixing means, resistance to loosening is realized from the rigid tubing itself. The rigid tubing provides additional rotational resistance about the axis of the end fitting. This is especially true where the geometry of the tubing includes bends and clamps.

In situations where two fitting assemblies utilizing the nut-locking device according to the present invention are used at either end of any geometric complexity of tubing, including a substantially straight run of tubing, any loosening torque encountered at one end fitting is directly resisted by the nut-lock fitting at the other end. This scenario is depicted in FIG. 9. Loosening torque (negative rotation) from vibration or other dynamic effects applied to the nut of the female assembly at one end fitting actually tightens (provides positive rotation) the nut from the female assembly on the male counterpart on the other end fitting.

Thus, although the nut-locking device according to the present invention operates sufficiently to resist loosening in a single fitting assembly on the end of a bent-tube, or the like, the present invention more preferably operates as a complete system where a nut-locking, fitting assembly is affixed to both ends of a length of tubing (especially on straight runs of tubing).

The present invention can also be used with many types of fittings including beam seal fittings, swivel wire type and slip-on type, flared and flareless fittings.

It is a feature of the locking mechanism according to the present invention to provide more resistance to loosening of the nut from the fitting assembly, and more preferably at least 2.5 times the amount of back-off torque supplied by the existing safety wire method of preventing nut back-off.

Thus, it is an object of the present invention to provide a locking device for a fluid fitting assembly.

It is another object of the present invention to provide a fitting assembly in which the nut resists back-off.

It is another object of the present invention to provide a locking device for a fluid fitting assembly which can be retrofitted to existing male-ended fittings.

It is still yet another object of the present invention to provide a locking device for a fluid fitting which is simple in design, lighter, and smaller in size than the prior art devices.

To accomplish the foregoing objects and advantages, one aspect of the current invention provides a locking mechanism for a fitting assembly of a fluid coupling including a fitting body, a securing member rotationally locked to the fitting body and a nut having a plurality of openings in cooperative relation to engage the securing member. When the nut is threaded onto a corresponding mated fitting, the securing member is engaged with at least one of the openings thereby locking the nut to the fitting body.

In another aspect of the present invention, a locking mechanism for a fitting assembly for a coupling includes a fitting body having an outer surface and a central axis, a spring member affixed to the outer surface, the spring member having a pawl projecting from the outer surface, and a nut having a plurality of ratchet teeth in cooperative relation to engage the pawl when the nut is threaded onto a corresponding mated fitting. The nut is restrained by the fitting body from rotating in a thread loosening direction by the engagement of the pawl with the ratchet teeth.

In yet another aspect of the present invention, a locking mechanism for a tubular fluid fitting assembly includes a fitting body having an outer surface and a central axis, a spring member affixed to the outer surface, with the spring member having a pawl projecting from the outer surface, and a nut having a plurality of ratchet teeth in cooperative relation to engage the pawl when the nut is threaded onto a corresponding mated fitting. The nut is restrained by the fitting body from rotating in a thread loosening direction by the engagement of the pawl with the ratchet teeth. The locking mechanism according to this aspect also includes a release member rotatably affixed to the nut where the release member includes an internal diameter for surrounding the spring member and/or said fitting body. The internal diameter includes a recess for receiving the pawl in an extended state. The locking device according to this aspect further includes a sleeve slidably affixed to the female assembly and surrounding a portion of the nut, the sleeve includes a helical recess for receiving a guide member positioned on the outer surface of the release member, an alignment member rotatably affixed to the release member, the alignment member including a sleeve guide which is received in a corresponding slot within the sleeve and includes an internal diameter having a fitting body guide member positioned thereon for being received by a corresponding recess on the fitting body and/or the spring member. Forcing the sleeve away from the mated fitting in a direction substantially parallel to the central axis results in the guide member traveling within the helical recess thereby rotating the release member in a pawl-disengaging direction to disengage the pawl from the ratchet teeth.

In yet another aspect of the present invention, a locking tubing system includes a length of tubing lying in any geometric complexity including a substantially straight line, a first fitting body having a securing member rotationally locked thereto, the first fitting body affixed to one end of the length of tubing, a first nut having a plurality of openings in cooperative relation to engage the securing member, a second fitting body having a securing member rotationally locked thereto, the second fitting body affixed to the other end of the length of tubing, and a second nut having a plurality of openings in cooperative relation to engage the securing member. When the first nut and the second nut are threaded onto corresponding mated fittings, each of the securing members are engaged with at least one of the openings of the respective nuts thereby locking each nut to the respective fitting body.

In yet another aspect of the present invention, a locking mechanism for a fitting assembly of a coupling includes a fitting body having a central axis, a nut having a plurality of ratchet teeth positioned parallel to the central axis and positioned on a rear portion of the nut, a sleeve having a front side and a back side. The sleeve surrounds a portion of the fitting body, slidably attached thereto allowing for substantially linear movement only, and includes a plurality of recesses adjacent the front side. The recesses include a shape substantially corresponding to a shape of the ratchet teeth of the nut and are positioned in cooperative relation to engage the ratchet teeth when the nut is threaded onto a mated fitting. Threading of the nut onto the male fitting allows the ratchet teeth of the nut to move relative to the recesses of the sleeve and restrains the nut from moving in a loosening direction.

In yet another aspect of the present invention, a locking mechanism for a tubular fluid fitting assembly includes a fitting body having a central axis, a nut having a plurality of openings positioned thereon, a sleeve surrounding a portion of the nut, the sleeve including a rear end having an internal diameter for receiving the fitting body and the rear end including an inner surface having a securing member projecting out therefrom in a direction toward the nut and substantially parallel to the central axis of the fitting body. The securing member is received within one of the plurality of openings after the nut has substantially engaged a mated fitting.

In yet another aspect of the present invention, a method for locking a nut of a female assembly of a fluid coupling to a fitting body of the female assembly when the female assembly is mated to a corresponding male fitting. The female assembly also includes a securing member rotationally locked to the fitting body for engagement with a plurality of openings provided on the nut when the nut is threaded onto the male fitting. The method includes the steps of threading the male fitting into the nut and engaging the securing member with at least one of the plurality of openings.

These and other aspects and objects, and many of the attendant advantages of this invention will be readily appreciated and understood by reference to the following detailed description when considered in connection with the accompany drawings.

BRIEF DESCRIPTION OF THE DRAWINGS

FIG. 3 is a rear perspective view of the locking device without the release mechanism according to the first embodiment for the present invention.

FIG. 4 is a front perspective view of the release mechanism for the locking device according to the first embodiment for the present invention.

FIG. 8A is a top plan view of the spring member and ratchet ring for use with the locking device according to the first embodiment for the present invention.

FIG. 8B is an enlargement of the connection between the spring member and the ratchet ring for use with the locking device according to the first embodiment for the present invention.

FIG. 10A is a side, partial cross-sectional view of the locking device for a fluid coupling according to the second embodiment of the present invention, illustrating the locking device disengaged.

FIG. 10B is a side, partial cross-sectional view of the locking device for a fluid coupling according to the second embodiment of the present invention, illustrating the locking device engaged.

DETAILED DESCRIPTION OF THE PREFERRED EMBODIMENTS

First Embodiment

Figure 1A:
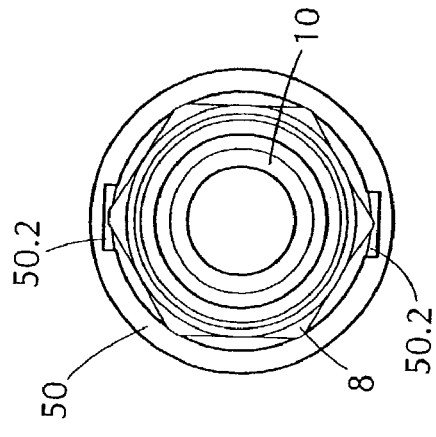
FIG. 1A is a side view of a locking device according to a first embodiment for the present invention.
Figure 1B:
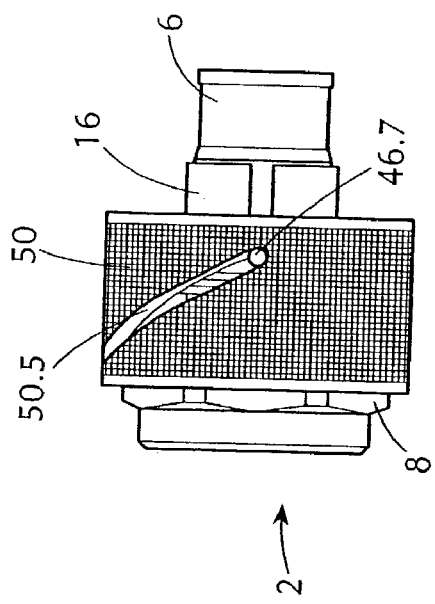
FIG. 1B is a front view of the locking device according to the first embodiment for the present invention.
Figure 1C:
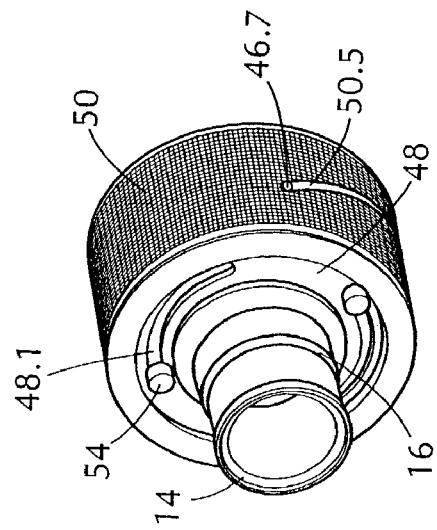
FIG. 1C is front perspective view of the locking according to the first embodiment for the present invention.
Figure 1D:
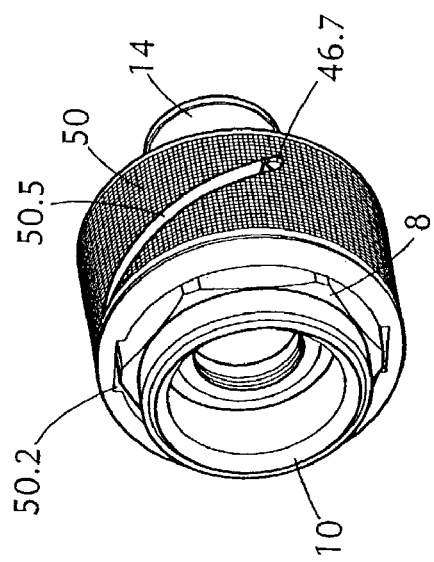
FIG. 1D is a rear perspective view of the locking device according to the present invention.
Figure 2:
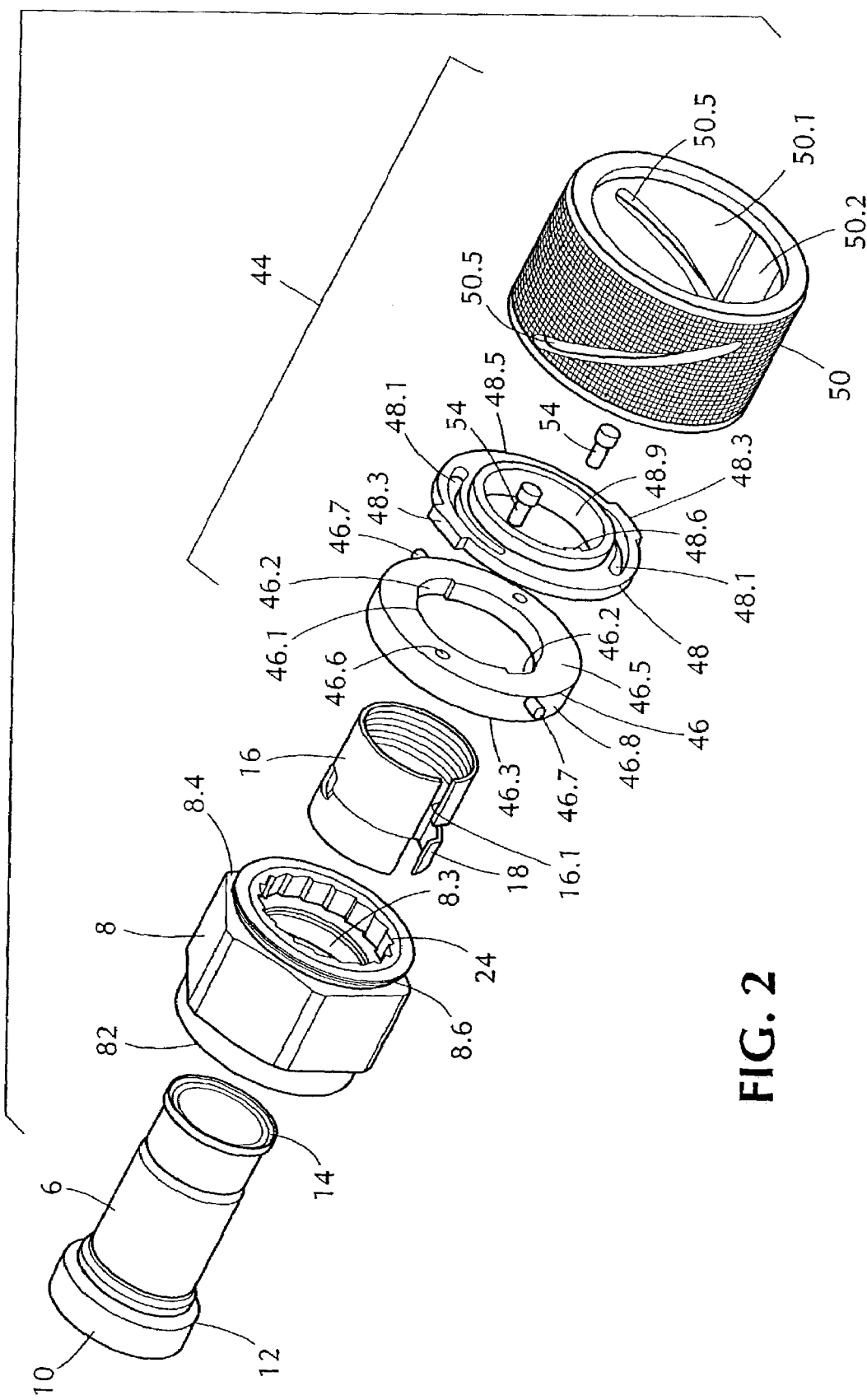
FIG. 2 is an exploded perspective view of the locking device according to the first embodiment for the present invention.
Figure 5:
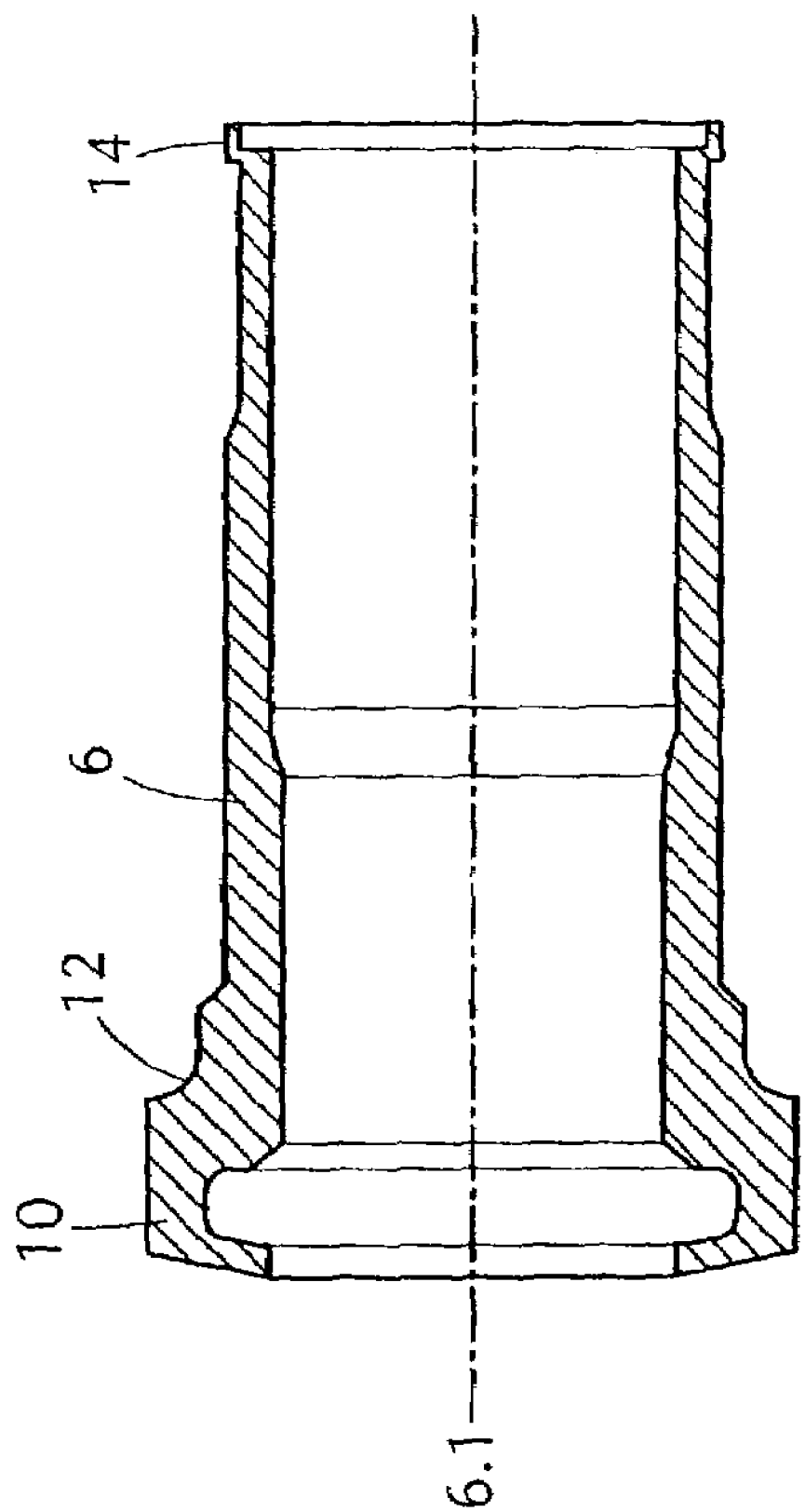
FIG. 5 is a side-sectional view of a female end of a tubular fitting for use with the locking device according to the first and third embodiments for the present invention.
Figure 6B:
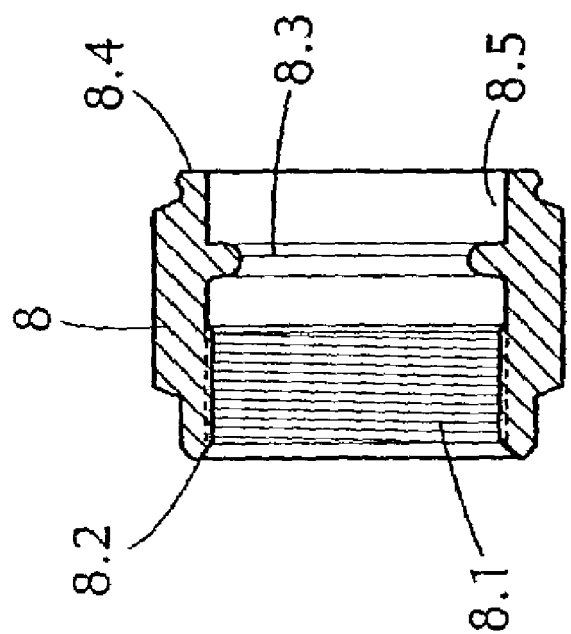
FIG. 6B is a side-sectional view of the nut for use with the locking device according to the first and third embodiments for the present invention.
Figure 6A:
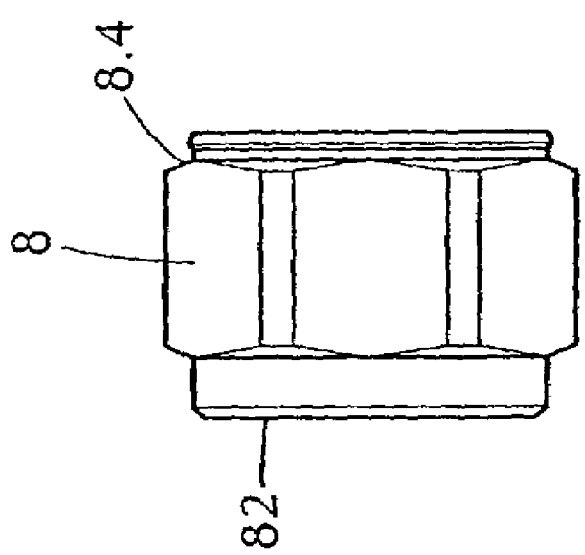
FIG. 6A is a side view of a nut for use with the locking device according to the first and third embodiments for present invention.
Figure 7B:
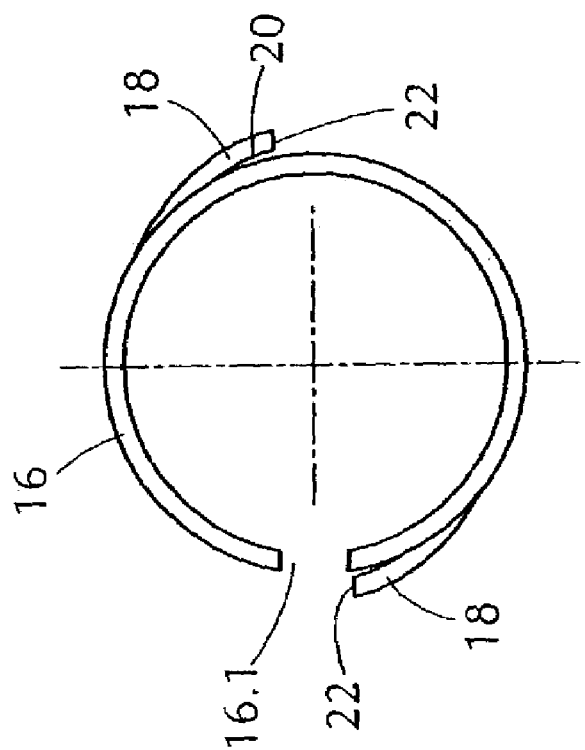
FIG. 7B is a top plan view of the spring member for use with the locking device according to the first embodiment for the present invention.
Figure 7A:
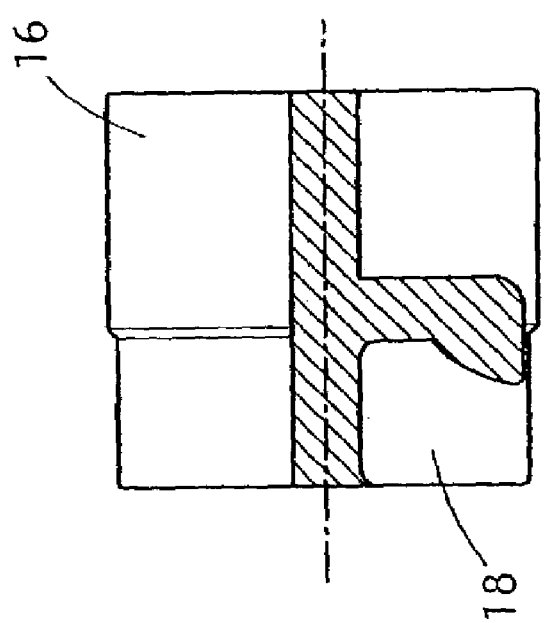
FIG. 7A is a side view of a spring member for use with the locking device according to the first embodiment for the present invention.

With reference to FIGS. 1–9, it will be seen that a female assembly 2 for a fluid coupling includes a tube body 6 positioned within a nut 8. The female assembly 2, both the tube body 6 and nut 8, may be manufactured from any high strength materials including plastics, metal alloys or composites thereof, and preferably made from a high strength metal alloy. The tube body 6 is a cylindrical hollow tube which includes an enlarged end 10 (front end) forming a shoulder portion 12, thereunder, for the female assembly 2. The other end 14 (rear end) of the female assembly 2 is mated to a hose or pipe (not shown) carrying fluid or gas to be passed through the fluid coupling.

Affixed between the ends 10 and 14 of the tube body 6, a spring member 16 having at least one pawl 18, or spring finger, positioned thereon. The spring finger is defined by a generally radially outwardly inclined surface 20 having an end portion 22 at a radius greater than the tube body 6. The spring member 16 is preferably made of the same material, preferably a high strength alloy, as the female assembly 2, which may be heat-treated in order to meet particular specifications. The spring member 16 is affixed to the tube body 6 by press-fitting, welding, fastening, adhesive, or the like. Alternatively, the spring member may be integral with the tube fitting body, being machined thereon.

The nut 8 of the female assembly 2 includes an internal threaded portion 8.1 provided for on the front end 8.2 of the nut and an internal circumferential collar 8.3 positioned between the front end and rear end 8.4 of the nut. The circumferential collar 8.3 is smaller in diameter than the enlarged end 10 of the tube body 6 to insure that when the tube body 6 is placed therein, it can slide in one direction only relative to the nut 8.

Positioned adjacent the rear end 8.4 of the nut, and preferably within a recess 8.5 of the nut is a series of ratchet teeth 24, arranged around the circumference of the recess 8.5. Each ratchet tooth 26 is defined by a generally radially inwardly extending flat surface or shoulder 28, and a radially inwardly inclined ramp surface 30. The inclined surfaces 28 and 30 of the ratchet teeth 24 are radially, inwardly inclined in the rotational direction, and are defined by a base radius 32 and a pitch radius 34. The difference between the base 32 and pitch 34 radii is, of course, the radial length of the shoulder 28.

Preferably, the ratchet teeth 24 are machined integral within the rear of the nut 8. However, the ratchet teeth may also be a separate member manufactured from any high strength material including plastic, metal alloy, and the like, or composites thereof, which is permanently affixed thereto by means of welding, adhesive, or other mechanical fastening means.

The ratchet teeth 24 are arranged on the rear of the nut 8, and positioned in a cooperative relation to the pawl 18 of the spring member 16 positioned on the tube body 6, when fully engaged with the male half of the fluid coupling. The pawl end 22 is positioned at a radius that is approximately equal to the base radius 32 of the ratchet teeth 24. Thus, as one threads the nut 8 of the female assembly 2 onto the counterpart male fitting to mate the male and female 2 halves of the fluid coupling together, the end of the pawl 22 rides up the inclined surface 30 of each ratchet tooth 26 to the pitch radius 34, thereby compressing the pawl 18 toward a center axis 6.1 of the tube body 6. At the end 30.1 of the inclined ramp 30 of each ratchet tooth 26, the spring finger 18 extends down the shoulder 28 to be received by a recess 32.1 formed by the base pitch 32 and the next inclined ramp. Thus, the nut 8 can only be advanced onto the male fitting. The nut 8 may only be loosened by manually moving the pawl 18 toward the center axis 6.1 of the tube body 6, so that it can be moved out of the recess 32.1 of the ratchet tooth 26.

This arrangement allows the nut 8 of the female assembly 2 to rotate in only one direction without undue force, thus locking the nut 8 onto the tube body 6. This arrangement insures that the nut 8 will resist backing off the male half of the fluid coupling under the severest of vibrational, environmental and other dynamic conditions.

Figure 9:
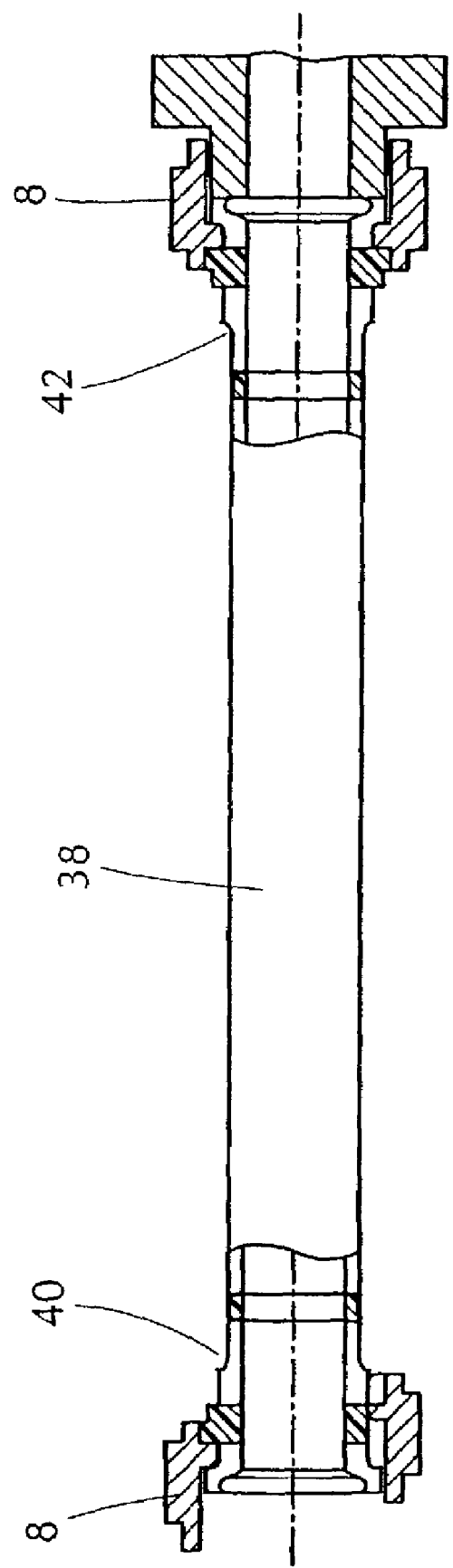
FIG. 9 is a side, partial cross-sectional view of the substantially straight run of tubing where each end includes the female assembly having the locking device according to the present invention.

Although the present invention operates efficiently to resist loosening on one end of a length of tubing, the present invention operates more preferably when used as a system, as shown in FIG. 9 that includes a locking female assembly 2 at both ends 40 and 42 of a piece of tubing 38 of any geometric complexity, including a substantially straight run of tubing.

As shown in FIG. 9, a female assembly 2 utilizing the nut-locking device according to the present invention is affixed at both ends 40 and 42 of a length of tubing 38 by welding, adhesive, or the like. When used in such a system, loosening torque applied at one end fitting is directly resisted by the fitting at the other end. Specifically, as shown in FIG. 9, loosening torque (negative rotation) from vibration or other dynamic effect applied at one end fitting actually tightens (positive rotation) the other end fitting, and thus, further increases loosening resistance.

An example of the maximum back-off torque for a fluid coupling using the locking device according to the first embodiment for present invention is detailed below. The example compares the present invention with the safety wire method for retaining a nut on a fluid coupling. For this example, the magnitude of torque required to back a nut off using the safety wire method is as follows:

Back-off Torque (BOT) equals force (F) on the safety wire times the distance (D) from the safety wire hole in the nut to the centerline of the nut.

$$BOT = F \times D$$

Yield strength of the wire is used as the stress in the wire to achieve a theoretical maximum torque value. Additional force can be developed in the wire if it is allowed to continue to yield. However, the resulting stretch of the wire would be considered unacceptable, since nut rotation would occur.

EXAMPLE

Using the safety wire method, in the case of a ½" fitting, the maximum size safety wire possible would be a diameter of 0.062". The force in the wire (yield strength) at 35,000 pounds per square inch (psi) would be 105 pounds (lbs.). Thus, the force acting on the nut would produce a torque of 44.7 inch-pounds (in-lbs.) since the wire hole location is 0.423" from the centerline of the nut.

However, the locking device according to the present invention has a compressive strength capability of 390 lbs. for a ½" fitting. This force acts at an effective location of 0.291" from the nut centerline, so that its torque capacity is 113 in-lbs., or about 2.5 times the maximum torque achieved using the safety wire method. This result is achieve using only one spring finger, and thus, is doubled to 5 times, if two spring fingers are used to interlock with the ratcheting teeth.

Although the nut can be loosened and/or removed from the male end of the fluid coupling assembly by applying a force to overcome the back-off torque created by the locking device according to the present invention, it is preferred if the pawl 18 be disengaged from the ratchet teeth 24 first. Otherwise, the locking mechanism according to the present invention may be temporarily or permanently damaged and not re-useable.

Thus, to be able to re-use the locking mechanism according to the present invention, it is preferable that the pawl 18 be disengaged from the ratchet teeth 24 prior to a mechanic applying any torque to loosen the nut.

Accordingly, the present invention utilizes a novel release mechanism 44 to disengage one or more pawls 18 of the spring member 16 from the ratchet teeth 24. Specifically, as shown in the figures, the release mechanism 44 according to the present invention includes a release ring 46 which is rotatably mounted to the tube body 6. The rotation of the release ring 46 disengages the pawls 18 from the ratchet teeth 24, by driving the ends 22 of each pawl 18 toward the center axis 6.1 of the tube body 6. The smooth and accurate rotation of the release ring 46 is accomplished by the relationship between a guide washer 48 and actuation sleeve 50.

The release ring 46 includes an inner diameter 46.1 with an inner recess 46.2 for receiving a pawl 18 in an expanded state. Rotation of the release ring in a releasing direction 52, causes the pawl 18 to be pushed toward the center axis 6.1 of the tube body 6, thus disengaging the pawl 18 from the ratchet teeth 24.

A front surface 46.3 of the release ring 46 includes a circumferential groove 46.4 which receives a corresponding circumferential ridge 8.6 positioned on the end 8.4 of the nut 8, surrounding the ratchet teeth 24. The ridge 8.6 is locked within the groove 46.4, so that the release ring 46 and nut 8 are inseparable. However, the release ring 46 is able to freely and easily rotate relative to the nut.

Although not necessary to practice the release mechanism 44 of the present invention, a guide washer or alignment member 48 and a sleeve 50 insure that the release mechanism 44 stays in alignment with the spring member 16 and tube body 6 to prevent jamming and insure smooth operation. The guide washer 48 accomplishes alignment by using a series of guides which are received in slots amongst other members. Specifically, on the back surface 46.5 of the release ring 46 are two openings 46.6 for affixing the ends of guide pins 54 that travel within two oppositely positioned arc slots 48.1 positioned adjacent the outer circumference of the guide washer 48. The arrangement allows the release ring 46 to freely rotate the length of the arc-slots 48.1 relative to the guide washer 48.

The guide washer 48 also insures smooth operation between the sleeve 50 and the release ring 46 through the use of two rectangular guide members 48.3, oppositely positioned one another adjacent the outer diameter 48.5 of the guide washer 48. The rectangular guide members 48.3 are received in corresponding rectangular slots 50.2 that run linearly along the inner surface 50.1 of the sleeve 50.

An internal guide member 48.6 positioned adjacent an inner diameter 48.9 of the of the guide washer 48 insures alignment between the sleeve 50, the release ring 46 and the spring member 16. The internal guide member 48.6 is received in a corresponding linear slot 16.1 in the spring member (and/or also a corresponding slot that may be positioned within the tube body).

Adjacent an outer diameter 46.8 of the release ring 46 are two outer guide pins 46.7 which are received by two helical guide slots 50.5 positioned through or partially through the wall 50.4 of the sleeve 50. The helical guide slots 50.5 force the release ring 46 to rotate in a clockwise direction as the sleeve 50 is forced away from a mated fitting in a straight motion. The rotation of the release ring 46, in turn, forces the pawls 18 inward against the tube body 6, disengaging the pawls 18 from the ratchet teeth 24.

The sleeve movement results in the nut hex being covered while the pawls are engaged, and uncovered when they are disengaged. This prevents any damage to the pawls by an untrained mechanic and also provides a visual indication of the pawl position; i.e., either locked or unlocked. To insure adequate gripping of the sleeve by the mechanic, a frictional surface, as shown in the figures, may be added to the outer diameter of the sleeve. The frictional surface may be machined into the sleeve, or be a separate member.

Second Embodiment

In the second embodiment for the present invention, as can be seen in FIGS. 10A and 10B, a female assembly 58 for a fluid coupling includes a tube body 62, a sleeve member 64 which contains a series of axially projecting ratchet teeth 66. The ratchet teeth 66 of the sleeve member 64 are arranged in a cooperative relation to corresponding axially rearward projecting ratchet teeth 68.1 provided on the backside of a nut 68 of the female assembly 58 of the fluid coupling.

In this embodiment, the tube body 62 includes a recess 62.1 positioned midway between two ends 62.5 and 62.6 of the tube body 62 for containing ball bearings 70 which are also received in a corresponding recess 64.1 in the sleeve member 64. The ball bearings 70 allow the sleeve member 64 to easily slide up and down the tube body 62, so that the ratchet teeth 66 of the sleeve 64 can be engaged or disengaged from the ratchet teeth 68.1 of the nut 68 when the assembly is installed or removed.

The tube body 62 may also include an additional circumferential recess 62.4 toward a front end 62.5, for a swivel wire 72 to be received by a corresponding recess 68.2 in the interior surface of the nut. This swivel wire 72 allows the nut 68 to rotate freely around the tube body 62, and also to slide in either direction along the front end 62.5 of the tube body 62.

The second embodiment also includes a spring 74, one end 74.1 of which abuts the ball bearings 70 contained in the sleeve 64. The other end 74.2 of the spring 74 is affixed or positioned adjacent a rear end 62.6 of the tube body 62.

Thus, when the female assembly 58 according to the second embodiment of the present invention is mated to a corresponding male end (not shown) of the fluid coupling, the nut 68 is threaded thereto by moving the sleeve 64 away from the nut 68 toward the rear end 62.6 of the tube body 62 so that the nut 68 may freely rotate onto the male end of the coupling.

Third Embodiment

Figure 11A:
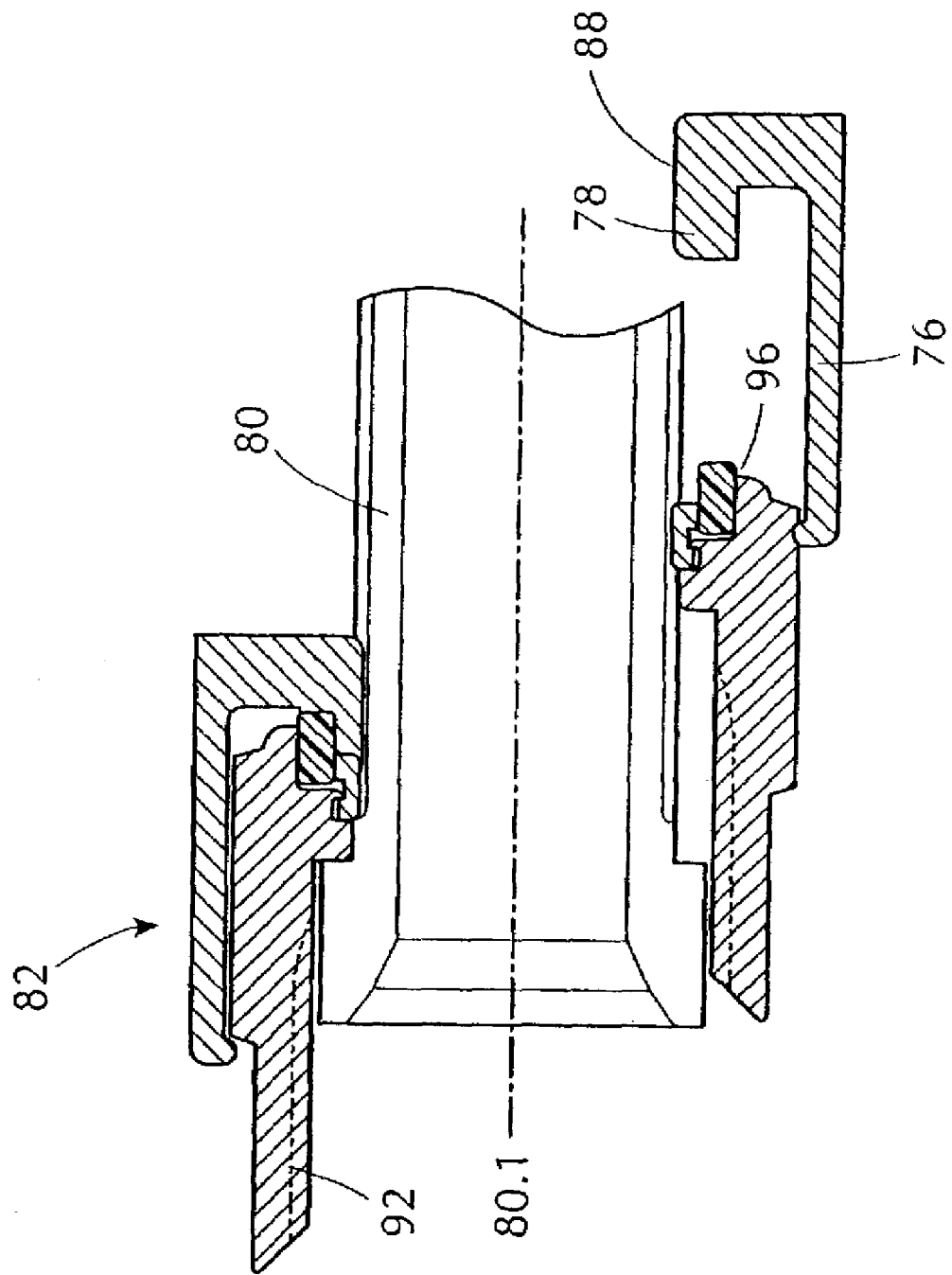
FIG. 11A is a schematic side-sectional view of a locking device according to a third embodiment for the present invention.
Figure 11B:
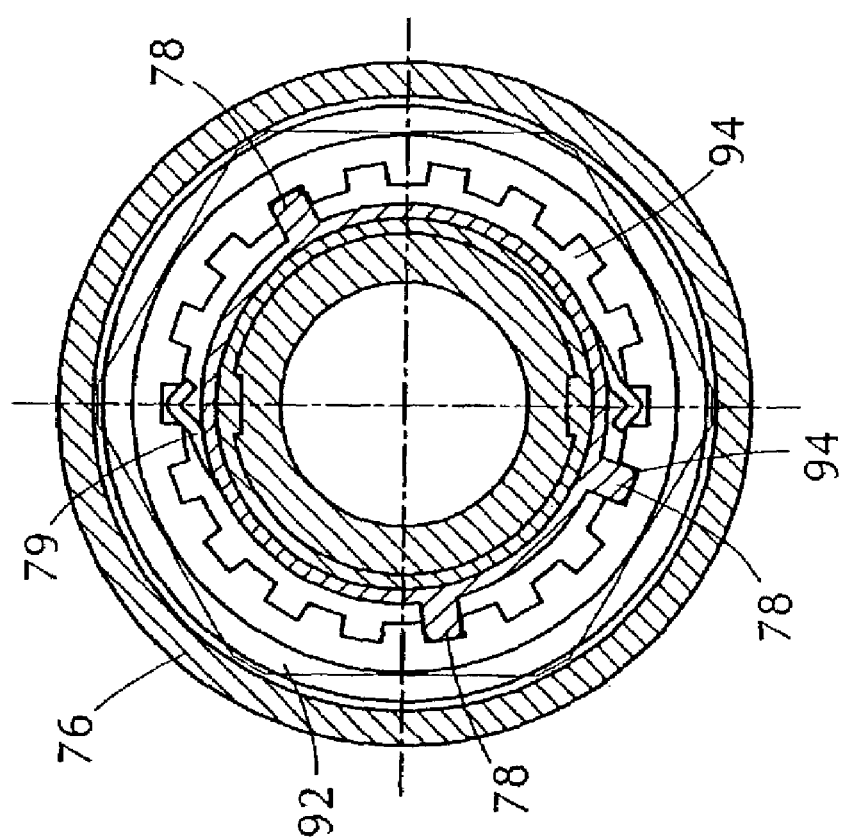
FIG. 11B is a top plan view of the locking device according to the third embodiment for the present invention.

In the third embodiment for the present invention, the ratchet mechanism is replaced with a locking pin or key 78, or plurality thereof, which is included on the rear portion of a sleeve 76. The present embodiment is illustrated in FIGS. 11A and 11B with three such locking pins 78 and a spring member 79, although any number of pins from a single pin to a pin for each and every slot may also be used. The sleeve 76 is slidably affixed to a tube body 80 of a female assembly 82 of the illustrated flared fitting fluid coupling, by use of key member 78 positioned on an inner diameter 88 of the rear portion of sleeve 76, which is received in a recess or keyway 94 machined into a outer circumference 96 of the nut 92. One or more of the keys/keyways may be used. The locking key/keyway enables the sleeve 76 to move in a linear motion parallel to a central axis 80.1 of the tube body 80, but restraining the sleeve 76 from rotating in any direction around the tube body 80.

Accordingly, the keys 78 are slid into corresponding keyways 94 in the back of the nut 92 when the nut is tightened onto the mated fitting. The keys 78 each act as a "DUTCHMAN" to lock the nut, via the sleeve 76, to the tube body 80 to prevent it from rotating in either direction. When the nut is in position so that the keyways may receive the keys, the position is called a lock location.

When the sleeve is pulled toward the mated fitting so that the keyway(s) receives the key (when the nut is in the lock location), the sleeve then covers the nut hex as in the second embodiment. This feature, as previously stated, prevents any possible wrenching damage by an untrained mechanic.

When the keys 78 are not engaged in the keyways 94, the nut 92 is rotationally held in a fixed position by the spring member. The nut may be rotated in either direction by applying a slight rotational force to the nut. A clicking noise signifies rotation and is the result of the end portion of the spring pawl engaging the splines. The spring member also insures that the recesses are properly aligned to receive the key members. Specifically, each time the audible click sounds, the recesses positioned on the rear of the nut are in proper alignment to receive the key member(s).

Fourth Embodiment

Figure 12:
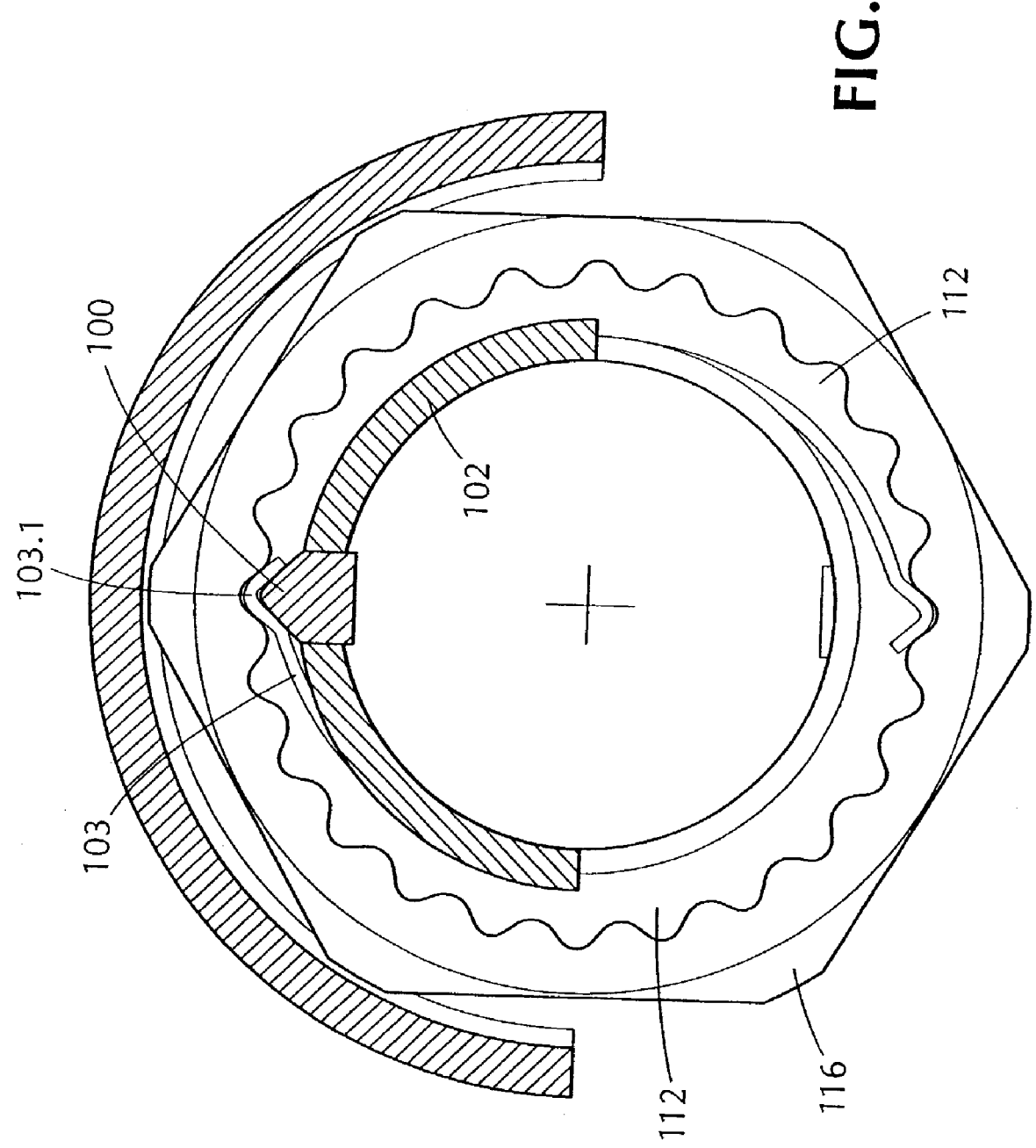
FIG. 12 is a top plan view of a locking device according to a fourth embodiment for the present invention.

As shown in FIG. 12, the fourth embodiment of the present invention is nearly identical to the third embodiment of the invention, except the fourth embodiment is designed with a key 100, positioned on the rear end of the sleeve, which sandwiches the end 103.1 of a pawl 103 of a spring member 102 attached the tube body of the female assembly, according to the present embodiment, between the key 100 and a recess or keyway 112 in the rear of a nut 116.

While the present invention for a locking device for use with fitting assembly, and variations thereof, are described in detail herein, it should be apparent that the disclosure and teachings of the present invention will suggest many other alternative designs to those skilled in the art. Accordingly, the present invention is not limited to the foregoing description.

What is claimed is:

1. A locking mechanism for a fitting assembly of a coupling comprising:
   a) a fitting body having a central axis and a first circumferential recess adjacent a flared end;
   b) a nut having a plurality of ratchet teeth positioned parallel to said central axis and positioned on a rear portion of said nut;
   c) a sleeve having a front side and a back side, said sleeve surrounding a portion of said fitting body and including a plurality of recesses adjacent said front side, said recesses having a shape substantially corresponding to a shape of said ratchet teeth of said nut, said sleeve recesses positioned in cooperative relation to engage said ratchet teeth when said nut is threaded onto a male fitting, said sleeve member slidably attached to said fitting body allowing only for substantially linear movement along said fitting body,
   wherein threading of said nut onto said male fitting allows said ratchet teeth of said nut to move relative to said recesses of said sleeve and restrains said nut from moving in a loosening direction.

2. The locking mechanism for a fitting assembly according to claim 1, further comprising a spring member positioned on said fitting body, said spring member for applying a linear force to said sleeve forcing said front side of said sleeve against the rear portion of said nut.

3. A locking mechanism for a fitting assembly comprising:
   a) a fitting body having a central axis;
   b) a nut having a plurality of locking teeth defining openings therebetween on a rear portion of the nut;
   c) a sleeve having a front side and a back side, said sleeve surrounding a portion of said nut, said sleeve including a rear end having an internal diameter for receiving said fitting body, said rear end including an inner surface having a securing member projecting out therefrom in a direction toward said nut, said securing member having a shape to engage said teeth of said nut and being positioned in cooperative relation to engage at least one of said teeth and be received within one of said plurality of openings after said nut has been threaded onto a mated fitting to substantially engage said mated fitting, said sleeve slidably attached to said fitting body allowing only for substantially linear movement along said fitting body,
   wherein the shape of said securing member engages said openings in such a fashion that threading of said nut onto said mated fitting allows said teeth of said nut to move relative to said securing member of said sleeve and restrains said nut from moving in a loosening direction.

4. The locking mechanism as set forth in claim 3, wherein said locking teeth are ratchet teeth.

5. The locking mechanism according to claim 3, further comprising a spring member affixed to an outer surface of said fitting body, said spring member having a pawl projecting from said outer surface for engagement with said openings.

6. The locking mechanism according to claim 3, wherein said sleeve may be slid away from said nut to a retraction position so that said securing member is retracted out of a corresponding opening of said nut so that said nut may be loosened and/or tightened with said mated fitting.

* * * * *